United States Patent [19]

Heilweil

[11] Patent Number: 4,498,994

[45] Date of Patent: Feb. 12, 1985

[54] HIGH TEMPERATURE STABLE DRILLING FLUIDS CONTAINING NON-AQUEOUS SOLVENTS

[75] Inventor: Israel J. Heilweil, Princeton, N.J.

[73] Assignee: Mobil Oil Corporation, New York, N.Y.

[21] Appl. No.: 413,575

[22] Filed: Aug. 31, 1982

[51] Int. Cl.$^3$ .......................... C09K 7/06; E21B 43/00
[52] U.S. Cl. ............................ 252/8.5 M; 252/8.55 R
[58] Field of Search ............. 252/8.5 A, 8.5 M, 8.5 P, 252/8.55 R

[56] References Cited

U.S. PATENT DOCUMENTS

| | | | |
|---|---|---|---|
| 2,297,660 | 9/1942 | Mazee | 252/8.5 |
| 3,025,234 | 3/1962 | Canterino | 252/8.5 |
| 4,046,197 | 9/1977 | Gruesbeck et al. | 252/8.5 X |
| 4,304,677 | 12/1981 | Stauffer et al. | 252/8.55 |
| 4,308,374 | 12/1981 | Vollbracht et al. | 528/348 X |
| 4,330,414 | 5/1982 | Hoover | 252/8.5 |
| 4,392,964 | 7/1983 | House et al. | 252/8.5 |

Primary Examiner—Herbert B. Guynn
Attorney, Agent, or Firm—Alexander J. McKillop; Michael G. Gilman; Charles J. Speciale

[57] ABSTRACT

There are provided drilling fluids containing densifying salt dissolved in a solvent for this salt. This solvent contains at least about 50 percent by weight of a liquid non-aqueous solvent such as, e.g., N-methyl-2-pyrrolidone, such that the overall solvent has desirable properties with respect to the ability to dissolve salt, miscibility with water, melting point, boiling point, flash point and viscosity.

19 Claims, No Drawings

HIGH TEMPERATURE STABLE DRILLING FLUIDS CONTAINING NON-AQUEOUS SOLVENTS

CROSS REFERENCE TO RELATED APPLICATIONS

Certain aspects of this application, particularly those pertaining to the use of a polyvinylpyrrolidone thickening agent, are related to applicant's copending U.S. application Ser. No. 413,571, the entire disclosure of which is expressly incorporated herein by reference.

BACKGROUND

The present invention relates to drilling fluids which contain non-aqueous solvents such as, e.g. N-methyl-2-pyrrolidone.

During the drilling of an oil well, a usually aqueous fluid is injected into the well through the drill pipe and recirculated to the surface in the annular area between the well-bore wall and the drill string. The functions of the drilling fluid include: lubrication of the drill bit, transportation of cuttings to the surface, overbalancing formation pressure to prevent an influx of oil, gas or water into the well, maintenance of hold stability until casings can be set, suspension of solids when the fluid is not being circulated, and minimizing fluid loss into and possible associated damage/instability to the formation through which drilling is taking place.

Proper balancing of formation pressure is obtained by establishing fluid density at the desired level usually via the addition of barite (greater than or equal to 95% barium sulfate). Transportation of cuttings and their suspension when the fluid is not circulating is related to the fluid viscosity and thixotropy which depend on solids content and/or use of a polymer. Filter loss control is obtained also by the use of clays and/or added polymers.

Fluid properties are constantly monitored during the drilling operations and tailored to accommodate the nature of the formation stratum being encountered at the time. When drilling reaches the producing formation special concern is exercised. Preferentially low solids content fluids are used to minimize possible productivity loss by solids plugging. Proper fluid density for overbalancing formation pressure may be obtained by using high salt concentration aqueous brines while viscosity and filter loss control may be obtained by polymer addition. Substantial future oil well drilling will be at depths between 15 and 30 thousand feet where temperatures encountered can be 350° F. Temperatures such as these, coupled with the desire for low solids content and preferably minimum added solids, require brine tolerant and high temperature stable polymers for viscosity and filtration control. Conventionally employed polymers such as starch, carboxymethyl cellulose, and modified polyacrylates are not stable at such high temperatures and some have severe brine tolerance limitations.

Current high density, clear brine systems utilize hydroxyethyl cellulose polymers and related materials as viscosifiers, but these are normally unstable at about 150° C., and tend to crosslink and gel with time and temperature which may cause various drilling operational problems.

SUMMARY

According to one aspect of the invention, there is provided a drilling fluid containing salt dissolved in a solvent for the salt, the solvent including at least 50% by weight of a liquid, non-aqueous solvent, such that the solvent for the salt has the following characteristics:
 (a) the ability to dissolve at least about 20% by weight of salt;
 (b) a complete miscibility with water;
 (c) a melting point of 20° C. or less;
 (d) a boiling point of at least 50° C.;
 (e) a flash point of at least 60° C.;
 (f) a viscosity of between about 0.3 and 100 cp at 25° C.

Preferably such liquid, non-aqueous solvents are also relatively non-toxic.

Examples of such liquid non-aqueous solvents include, e.g., N-methyl-2-pyrrolidone; dimethyl sulfoxide; N,N-dialkylformamide (e.g. N,N-di-$C_{1-6}$ alkylformamide, particularly, N,N-dimethylformamide); tributyl phosphate; 1,2-propylene glycol; trimethylene glycol; ethylene glycol monobutyl ether (i.e. Butyl Cellosolve) and similar ethoxylthanols or glycolethers; diethylene glycol monobutyl ether (i.e. Butyl Carbitol) and similar glycol diethers; diethylene glycol; hexylene glycol; 1,2,6-hexanetriol; similar compounds, e.g. in the category of glycols and triols; and mixtures thereof. In addition to having water miscibility, the non-aqueous solvents suitable for use in the present invention are preferably miscible with polar solvents in general, such as those solvents mentioned above.

A preferred liquid, non-aqueous solvent is N-methyl-2-pyrrolidone.

According to another aspect of the invention, there is provided a method for transporting cuttings away from a drill bit to the surface a bore hole, said method comprising entraining and suspending said cuttings in a drilling fluid which flows from said drill bit up said bore hole to said surface, wherein said drilling fluid comprises salt dissolved in a solvent containing at least 50% by weight of a liquid non-aqueous solvent.

DETAILED DESCRIPTION

By use of the present invention, there is provided a means for drilling bore holes with an essentially non-aqueous drilling fluid. There are several potential problems associated with aqueous, clear brine drilling fluids which are particularly relevant in deep well operations. One is the danger of hydrothermal dissolution of formation rocks which can lead to formation plugging and reduction of hydrocarbon production. Under some conditions, hydrothermal dissolution leads to formation fracture, sloughing, hole enlargement, followed by troublesome drill pipe sticking, loss of expensive drilling fluid to formations, contamination and loss of efficiency of drilling fluids by intrusion of formation brines, etc.

Another problem which may have grave economic and safety consequences is well blowouts caused by the escape of $H_2S$, light hydrocarbons, and other gases dissolved or dispersed in the drilling fluids when exposed to reduced pressures near the surface. (Conventional fluids contain dispersed solid iron oxide, zinc carbonate, etc. to react with $H_2S$; the incorporation of large solid particles into clear fluids clearly defeats the purpose of such fluids to be free of solids.)

By means of the present invention, a non-aqueous, high temperature, stable, dense, clear drilling fluids, particularly suitable for deep drilling, can be formulated with non-aqueous solvents such as N-methyl-2-pyrrolidone (MP). This fluid, upon incorporation of salts (e.g., $CaBr_2$) exhibits high densities and high inherent viscosities; the viscosities can be increased further by temperature stable polymers (e.g., polyvinylpyrrolidone, PVP) which provide viscosifying and filtration loss control properties. In addition, the MP-based fluid has many other desirable features; it has a high capacity to dissolve $H_2S$ and other gases which would minimize well blowouts; its freezing temperature is below that of water which makes it suitable for operations in cold climates; it does not swell montmorillonite clay and hence bore hole instabilities would be reduced; it is non-corrosive (to protect drill strings, etc.), miscible with aqueous brines (this reduces effects of formation brine intrusion); it is claimed to be biodegradable and of low toxicity.

In accordance with the present invention, a drilling fluid may comprise a salt and a solvent for the salt, which solvent is predominately composed of non-aqueous solvent. Other additives to the drilling fluid are also possible such as polymeric thickening agents, filter control solids and oil mixing agents. Although the solvent may consist entirely of a single non-aqueous solvent, other cosolvents may also be present. For example up to about, e.g., 10% by weight of water may be incorporated into the solvent medium by means of water of hydration associated with the salts dissolved in the solvent. Accordingly, the solvent of the drilling fluid may contain at least about 50% by weight or even at least about 90% by weight of non-aqueous solvent.

Examples polymeric thickeners for use as an optional ingredient of the drilling fluid are polyvinylpyrrolidone polymers having at least 50 mole percent of vinylpyrrolidone repeating units. A preferred polyvinylpyrrolidone polymer is a polymer of the formula

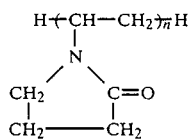

where n is at least about 90. Copolymers of N-vinyl-2-pyrrolidone with other unsaturated, addition polymerizable monomers are also possible, provided that the repeating polymeric units of the copolymers are predominately vinylpyrrolidone units. Such copolymers preferably have a molecular weight of at least 10,000.

The drilling fluid may either contain solid or it may be solids free. Solids free drilling fluids are particularly useful as completion fluids when the drill bit is in the vicinity of an oil or gas producing formation.

The concentration of salt in the drilling fluid may be from about 10% or even 30% by weight up to the saturation point of the fluid. The saturation point of the fluid may even be exceeded, particularly when it is desired to have undissolved salt act as a filter control solid. Particular examples of salts which may be used include $CaBr_2$, $KSCN$, and mixtures thereof.

EXAMPLE 1

Densification 30 wt % $CaBr_2 \cdot 2H_2O$ dissolved in MP gave a solution with a density of 1.3 g/ml. The rate of dissolution of the salt was enhanced by heating at elevated temperatures. Other salts, for example, KSCN, $ZnBr_2$, and $ZnCl_2$ are also soluble and can be used for densification. It appears that salts with large anions are preferable.

$CaBr_2$ and KSCN give clear solutions, whereas the Zn salts lead to somewhat turbid, colloidal systems. These colloidal systems may find utility in filtration loss prevention, recognizing that the average pore dimensions of formations decreases with depth and that for effective filter loss inhibition the dimensions of the additives should approach the dimensions of the pores.

EXAMPLE 2

Viscosifying/Filter Loss Prevention-MP and Salt

The inherent viscosity of MP is increased by the dissolution of $CaBr_2$. A 10 wt % $CaBr_2 \cdot 2H_2O$ solution gave a viscosity of 10.5 cp at 25° C. and 11.5 sec$^{-1}$. At 20 wt % the viscosity increased to 70 cp under the same conditions. Without the salt, MP viscosity is 2 cp.

These viscosities at a given wt % salt decrease with temperature. Thus, for a 27 wt % $CaBr_2 \cdot 2H_2O$ solution, the viscosity of 292 cp at 25° C. dropped to 94 cp at 41° C. and 30 cp at 60° C. At great depths (high temperature), the low viscosities should lead to reduced friction at the drill bit (estimated viscosity at 200° C. is 0.3 cp). On the other hand, high viscosities near the surface would decrease drilling fluid loss to formations.

EXAMPLE 3

Viscosifying/Filter Loss Prevention-MP/Salt/Polymer

The viscosity of MP densified with 23 wt % $CaBr_2 \cdot 2H_2O$ increased from 70 cp at 11.5 sec$^{-1}$ at 25° C. to 100 cp upon addition of polyvinylpyrrolidone (PVP) at 1.5 wt % (PVP MW=360,000). The viscosity of this fluid is increased further upon addition of higher MW PVP polymer, e.g., Luviskol with K values=90.

EXAMPLE 4

Thermal Stability-Static Aging

The viscosity of densified MP (23 wt % $CaBr_2$), containing 1.5 wt % PVP (MW 360,000, 100 cp at 25° C. and 11.5 sec$^{-1}$) was retained after heating at 220° C. for 16 hours. This evidence of high temperature stability demonstrates the potentiality of the MP/PVP/brine system for deep well operations.

EXAMPLE 5

Swelling

Using HPM 20 montmorillonite clay (American Colloid Co.), MP alone in a "free volume swelling test"* gives a value of 0.5 ml, compared to 20 ml for $H_2O$. MP containing 1.5 wt % PVP and 1.5 wt % of PVP plus 2.5 wt % $CaBr_2 \cdot 2H_2O$ gave a swelling volume of 5 ml. This compares with the value of 3 ml for an aqueous brine containing a much higher concentration of $CaBr_2$ (55 wt %).

*Volume of 1 gm of clay in 100 ml of solvent or solution upon equilibration.

Since 1.5 wt % PVP in MP gave the same volume as PVP+$CaBr_2$ in MP, and no swelling in MP alone was detected, the above results indicate that the measured volumes are principally due to flocculated sediment and not to clay swelling.

EXAMPLE 6

Miscibility

MP/CaBr$_2$ brine is readily and completely miscible with aqueous brine. For example, MP/CaBr$_2$ brine (1.24 g/ml) when mixed with aqueous brine (1.72 g/ml) in 1:1 proportion resulted in a mixed brine of intermediate density (1.4 g/ml).

Diesel oil and a representative crude (e.g., Gippsland crude) readily dispersed with mild agitation but separated on standing. However, it is possible that more stable dispersions might be formed using various polymers and/or surfactants.

Patents and the open literature provide data to support the notion that MP systems are able to dissolve high concentrations of H$_2$S, hydrocarbons, and other gases (see M-Pyrol Handbook, GAF Corporation, 1972). MP is biodegradable and of low toxicity. Its freezing point is −24° C. It causes little corrosion with many steel alloys and brasses (see M-Pyrol Handbook, GAF Corporation, 1972).

High density, aqueous brine completion, workover, and packer fluids have become recognized in the last few years for their effectiveness in minimizing formation damage and providing wellbore stability, as well as in establishing and maintaining high productivity of oil and gas wells, G. Poole, Oil and Gas. J., July 13, 1981, p. 151; D. Acosta, Ibid., Mar. 2, 1981, p. 83; R. J. Spies et al., SPE 9425, September 1980.

Specifically, high density brine fluids are solutions containing 10 to 60 weight percent of salts such as NaCl, CaCl$_2$, CaBr$_2$, ZnBr$_2$ and their mixtures, having densities up to ∼2.4 g/cc (∼20 lbs/gal). Their high salt content reduces swelling and dispersion of formation clays and shales by favorable ion exchange and osmotic pressure reduction. Their high densities provide sufficient hydrostatic head to balance formation pressures and thus prevent the influx of undesirable fluids into wells during drilling. Since they are free of dispersed solids, the high density fluids are particularly noted for their prevention of formation plugging, high hydrocarbon recovery, and efficient bottomhole cleaning.

With current accelerated efforts to discover new oil and gas deposits by deep drilling (say, below 10,000 feet) (Note B. Tippee, Oil and Gas J., Aug. 10, 1981, p. 33), it has become recognized that future developments in drilling fluid technology must make use of viscosifiers, fluid loss control agents, and other additives that are capable of satisfactory performance at high temperatues (>135° C., >275° F.) and high pressures (>5,000 psi). The use of N-methyl-2-pyrrolidone may lead to particularly useful high temperature stable, high density brine drilling fluids.

The viscosity increasing amount of polymer used in accordance with aspects of the present invention is that amount which is sufficient to achieve the desired functions of transportation of cuttings to the surface and suspension of solids when the drilling fluid is not being circulated. Certain drilling fluids of the present invention, particularly completion fluids, especially those containing N-methyl-2-pyrrolidone, are felt to be useful when drilling in formations having a temperature of at least 300° F. (e.g., 300°–450° F.). Such temperatures may occur at drilling depths of at least 15,000 feet (e.g., 15,000–30,000 feet).

The drilling fluids of the present invention preferably do not contain starch, carboxymethyl cellulose, or modified polyacrylates as polymeric thickeners or mixing agents such as crude oil and diesel oil.

The present invention may comprise, consist essentially of or consist of the materials or method steps described herein.

What is claimed is:

1. A solids free completion fluid for use in drilling a bore hole with a drill bit, wherein said drill bit is in the vicinity of an oil or gas producing formation, said completion fluid consisting essentially of
   (i) a solvent, said solvent comprising at least about 90% by weight of N-methyl-2-pyrrolidone, the remainder of said solvent being essentially water;
   (ii) a density increasing salt dissolved in said solvent in an amount sufficient to increase the density of said fluid in order to balance the formation pressure; and
   (iii) a viscosity increasing amount of polyvinylpyrrolidone polymers having at least 50 mole percent of vinylpyrrolidone repeating units.

2. A drilling completion fluid according to claim 1 having a salt concentration from about 30% by weight up to the saturation point of the fluid.

3. A drilling completion fluid according to claim 1, wherein said one or more polyvinylpyrrolidone polymers is a polymer of the formula

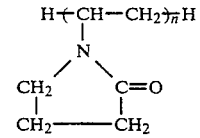

where n is at least about 90.

4. A drilling completion fluid according to claim 1, wherein said density increasing salt is selected from the group consisting of CaBr$_2$, KSCN and mixtures thereof.

5. A drilling completion fluid according to claim 1, wherein said density increasing salt is calcium bromide.

6. A method for transporting cuttings away from a drill bit to the surface of a bore hole, said method comprising entraining and suspending said cuttings in a drilling fluid which flows from said drill bit up said bore hole to said surface, wherein said drilling fluid comprises a density increasing salt dissolved in a solvent for said salt, said solvent comprising at least about 50% by weight of a liquid non-aqueous solvent, and said salt being present in said fluid in an amount sufficient to increase the density of said fluid in order to balance formation pressure, wherein said solvent for said salt has the following characteristics:
   (a) the ability to dissolve at least about 20% by weight of salt;
   (b) a complete miscibility with water;
   (c) a melting point of 20° C. or less;
   (d) a boiling point of at least 50° C.;
   (e) a flash point of at least 60° C.; and
   (f) a viscosity of between about 0.3 and 100 cp at 25° C., wherein said non-aqueous solvent is selected from the group consisting of N-methyl-2-pyrrolidone; dimethyl sulfoxide; N,N-dialkylformamide; tributyl phosphate; 1,2-propylene glycol; trimethylene glycol; ethylene glycol monobutyl ether; diethylene glycol monobutyl ether; diethylene glycol; hexylene glycol; 1,2,6-hexanetriol; and mixtures thereof.

7. A method according to claim 6, wherein said non-aqueous solvent is N-methyl-2-pyrrolidone.

8. A method according to claim 6, wherein said solvent comprises at least about 90% by weight of N-methyl-2-pyrrolidone, the remainder of said solvent being essentially water.

9. A method according to claim 6, wherein the concentration of said salt is from about 10% by weight up to the saturation point of the fluid.

10. A method according to claim 6, wherein the concentration of said salt is at least about 30% by weight.

11. A method according to claim 6, wherein said salt is selected from the group consisting of $CaBr_2$, KSCN and mixtures thereof.

12. A method according to claim 6, wherein said drilling fluid is solids free.

13. A method according to claim 12, wherein said drill bit is in the vicinity of an oil or gas producing formation.

14. A method according to claim 6, wherein said drilling fluid further comprises filter loss control solids.

15. A method according to claim 6, wherein said drilling fluid further comprises a viscosity increasing amount of one or more viscosity increasing polymers.

16. A method according to claim 15, wherein said polymers are polyvinylpyrrolidone polymers having at least 50 mole percent of vinylpyrrolidone repeating units.

17. A method according to claim 16, wherein said one or more polyvinylpyrrolidone polymers is a polymer of the formula

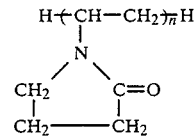

where n is at least about 90.

18. A method according to claim 6, wherein said drill bit is at a depth of at least about 10,000 feet below said surface.

19. A method according to claim 6, wherein the temperature in vicinity of said drill bit is at least about 135° C.

* * * * *